United States Patent
Roy et al.

(10) Patent No.: US 7,283,070 B1
(45) Date of Patent: Oct. 16, 2007

(54) DYNAMIC CALIBRATION OF I/O POWER SUPPLY LEVEL

(75) Inventors: Aninda K. Roy, San Jose, CA (US); Claude R. Gauthier, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 737 days.

(21) Appl. No.: 10/741,680

(22) Filed: Dec. 19, 2003

(51) Int. Cl.
  *H03M 7/40* (2006.01)
(52) U.S. Cl. .......................... 341/67; 341/50
(58) Field of Classification Search ........... 341/50–90; 714/814
  See application file for complete search history.

(56) References Cited

U.S. PATENT DOCUMENTS

| | | | |
|---|---|---|---|
| 7,028,240 B1* | 4/2006 | Bautista et al. ............. | 714/733 |
| 7,043,683 B2* | 5/2006 | Amick et al. ................ | 714/814 |
| 7,159,086 B2* | 1/2007 | Bress et al. .................. | 711/162 |
| 2004/0203477 A1* | 10/2004 | Carballo et al. .............. | 455/69 |

\* cited by examiner

*Primary Examiner*—Lam T. Mai
(74) *Attorney, Agent, or Firm*—Osha-Liang LLP

(57) ABSTRACT

An input/output interface is used to transmit data between a transmitting circuit and a receiving circuit. Selectively during both system startup and system operation, a known bit pattern transmitted by the transmitting circuit is compared to a received bit pattern. The received bit pattern may be seen at the receiving circuit or a voltage regulator that is used to control the power supply level of the input/output interface. Dependent on the comparison of the known bit pattern and the received bit pattern, a bit error rate across the input/output interface is determined, in response to which the voltage regulator adjusts the power supply level of the input/output interface.

18 Claims, 5 Drawing Sheets

DYNAMIC CALIBRATION OF I/O POWER SUPPLY LEVEL

BACKGROUND OF INVENTION

As shown in FIG. 1, a typical computer system 10 includes at least a microprocessor 12 and some form of memory 14. The microprocessor 12 has, among other components, arithmetic, logic, and control circuitry that interpret and execute instructions necessary for the operation and use of the computer system 10. Further, the computer system 10 includes integrated circuits 16 having various functionalities and communication paths, i.e., buses and wires 18, that are necessary for the transmission and reception of data among the aforementioned components of the computer system 10.

As the frequencies of modern computer systems increase, the need to rapidly transmit data between integrated circuits (e.g., 16 in FIG. 1) also increases. To accurately receive data, a clock signal is often transmitted in correspondence with the data signal to help recover the data at a receiving end. In such "source synchronous" input/output (I/O) interfaces, the clock signal determines when the data signal should be sampled by a receiving circuit.

FIG. 2 shows a block diagram of a typical I/O interface 20. In the I/O interface 20, a transmitting circuit 22 sends data on a data signal 26 to a receiving circuit 24. To aid in the recovery of data transmitting on the data signal 26, a clock signal 28 is transmitted with the data signal 26.

Those skilled in the art will understand that multiple data and clock signals may be propagated between the transmitting circuit 22 and the receiving circuit 24. Further, those skilled in the art will understand that the receiving circuit 24 may transmit data and/or a clock signal back to the transmitting circuit 22.

The data signal 26 and the clock signal 28 are used to transmit information from the transmitting circuit 22 to the receiving circuit 24 under the direction of a control signal 30. The control signal 30 may determine on which cycle, what frequency, and/or under which operating mode data and clock signals should be transmitted between the transmitting circuit 22 and the receiving circuit 24.

Performance across an I/O interface may degrade as a result of various conditions such as, for example, process, temperature, and voltage variations. Such performance degradation may lead to inaccurate data reception. In other words, a receiving circuit may not accurately receive data bits as transmitted by a transmitting circuit. For example, due to undesirable conditions, a receiving circuit may only accurately receive 995 of 1,000 data bits transmitted by the transmitting circuit during a particular time interval, thereby resulting in a 0.5% bit error rate. In some computer systems, even a 0.5% bit error rate may be fatal to the accurate operation of the computer system.

SUMMARY OF INVENTION

According to one aspect of one or more embodiments of the present invention, a computer system comprises: an input/output interface operatively connected to a transmitting circuit and a receiving circuit, where the input/output interface is arranged to propagate a data signal between the transmitting circuit and the receiving circuit; a test stage arranged to compare a known bit pattern transmitted from the transmitting circuit with a received bit pattern; and a voltage regulator operatively connected to the test stage and arranged to control a power supply level of the input/output interface, where the voltage regulator is dynamically adjustable dependent on the comparison.

According to one aspect of one or more embodiments of the present invention, a method of communicating across an input/output interface between a transmitting circuit and a receiving circuit comprises selectively transmitting a known bit pattern, receiving a bit pattern corresponding to the known bit pattern, comparing the known bit pattern with the received bit pattern, and dynamically adjusting a power supply level of the input/output interface dependent on the comparison.

According to one aspect of one or more embodiments of the present invention, a computer system comprises: means for transmitting data; means for receiving data; means for interfacing the means for transmitting data and the means for receiving data; means for comparing a known pattern of data transmitted by the means for transmitting data with a received pattern of data corresponding to the known pattern of data; and means for controlling a power supply level of the means for interfacing, where the means for controlling dynamically adjusts the power supply level dependent on the means for comparing.

According to one aspect of one or more embodiments of the present invention, a computer system comprises: a transmitting integrated arranged to output data, a clock signal, and a control signal to a receiving integrated, where a characteristic of any one of the data and the clock signal is dependent on a power supply level; the receiving integrated arranged to input the data, the clock signal, and the control signal, where the receiving integrated comprises a delay locked loop arranged to output a chip clock signal dependent on the clock signal, a latch arranged to latch the data dependent on the chip clock signal, where the latched data forms a received bit pattern, and a test stage arranged to selectively compare the received bit pattern with a corresponding known bit pattern transmitted to the receiving integrated via the control signal; and a voltage regulator arranged to control the power supply level dependent on the comparison.

According to one aspect of one or more embodiments of the present invention, a computer system comprises a transmitting integrated circuit, a receiving integrated circuit, an input/output interface arranged to handle data communication between the transmitting integrated circuit and the receiving integrated circuit, and a voltage regulator operatively connected to the input/output interface and arranged to control a power supply level of the input/output interface, where the voltage regulator comprises: circuitry arranged to receive a data pattern transmitted by the transmitting integrated circuit; circuitry arranged to receive a known data pattern corresponding to the received data pattern; and circuitry arranged to generate an adjustment signal based on a selective comparison of the known data pattern with the received data pattern, where the voltage regulator is arranged to dynamically adjust the power supply level dependent on the adjustment signal.

Other aspects and advantages of the invention will be apparent from the following description and the appended claims.

DETAILED DESCRIPTION

Embodiments of the present invention relate to a computer system that includes an I/O interface having a power supply level that is adjustable dependent on the behavior of data across the I/O interface. Embodiments of the present invention also relate to an I/O interface power supply level that can be dynamically calibrated based on a bit error rate across the I/O interface.

Figure 1:
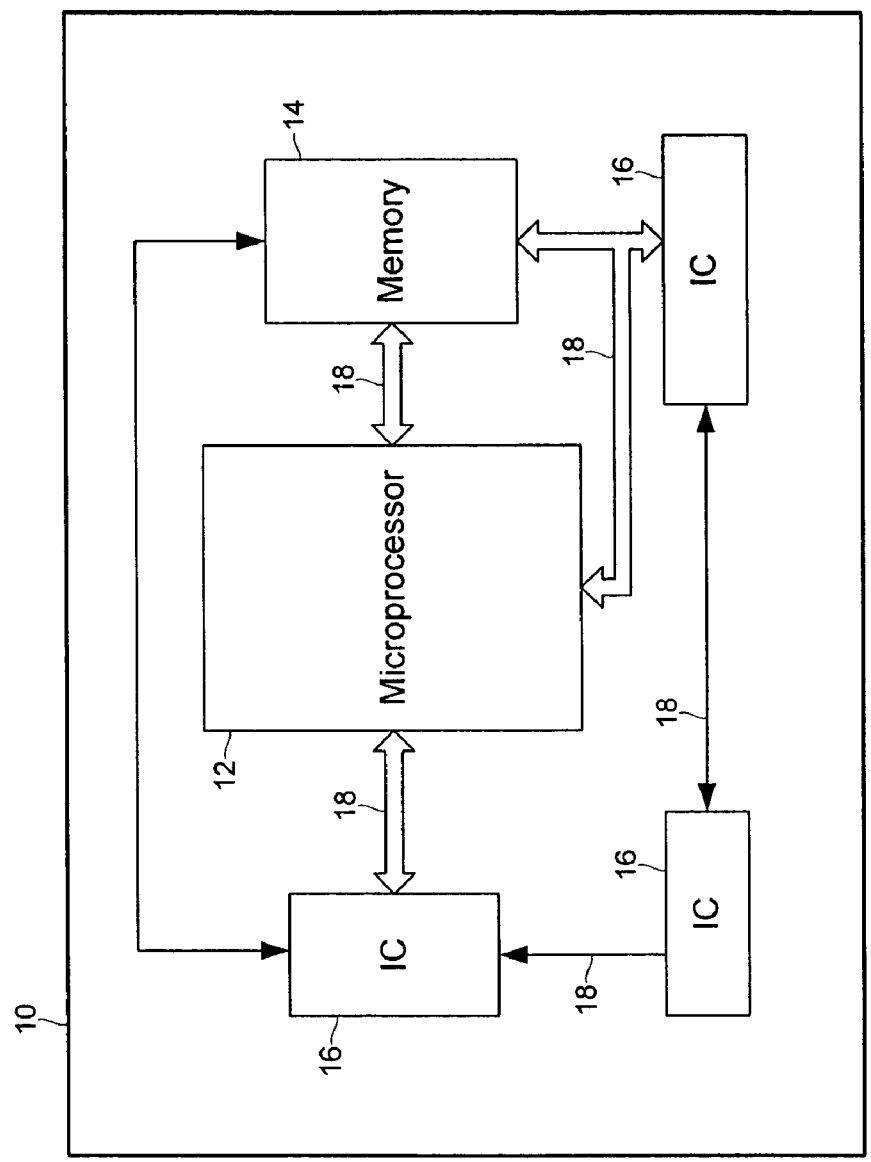
FIG. 1 shows a typical computer system.
Figure 2:
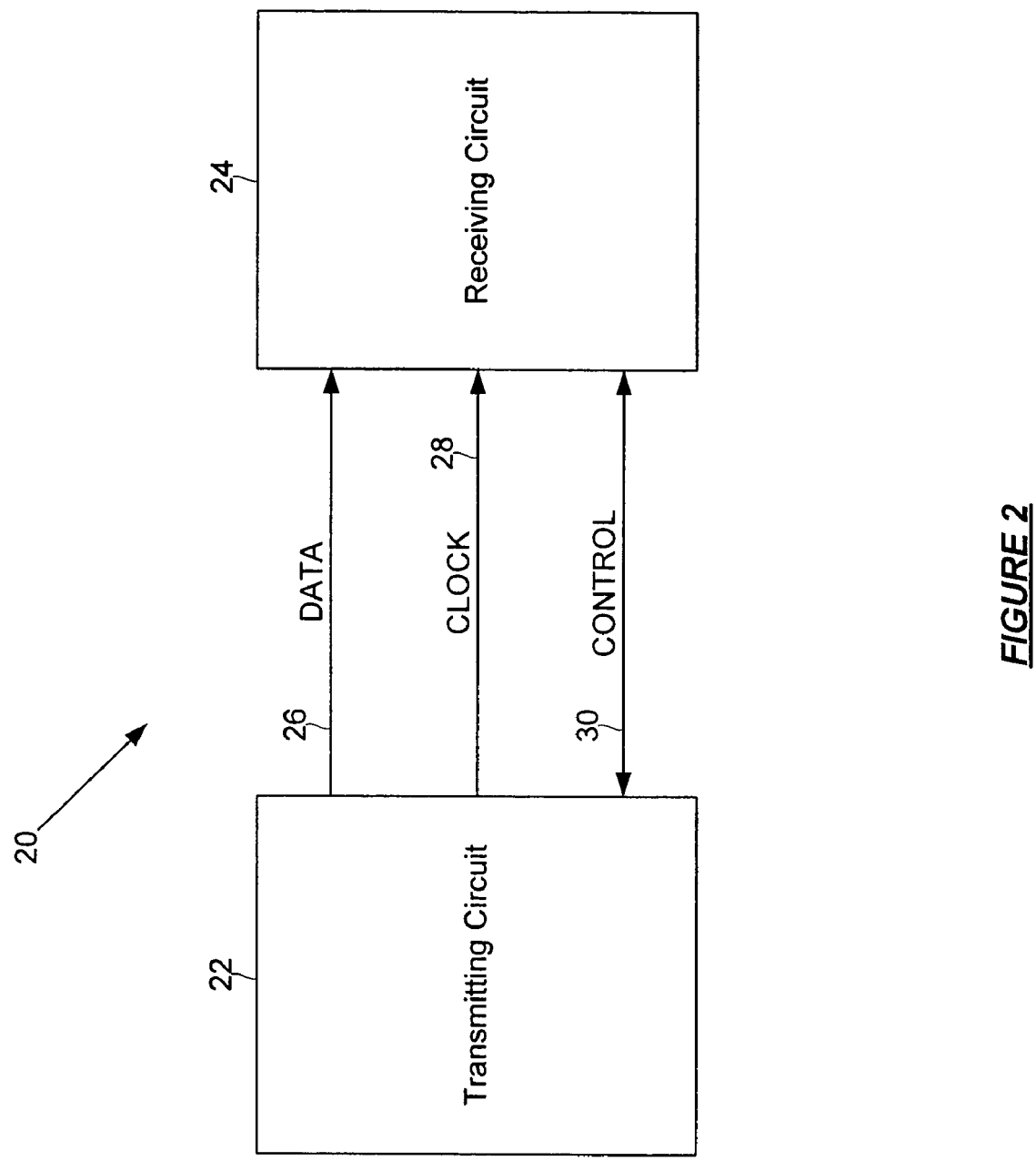
FIG. 2 shows a typical I/O interface.
Figure 3:
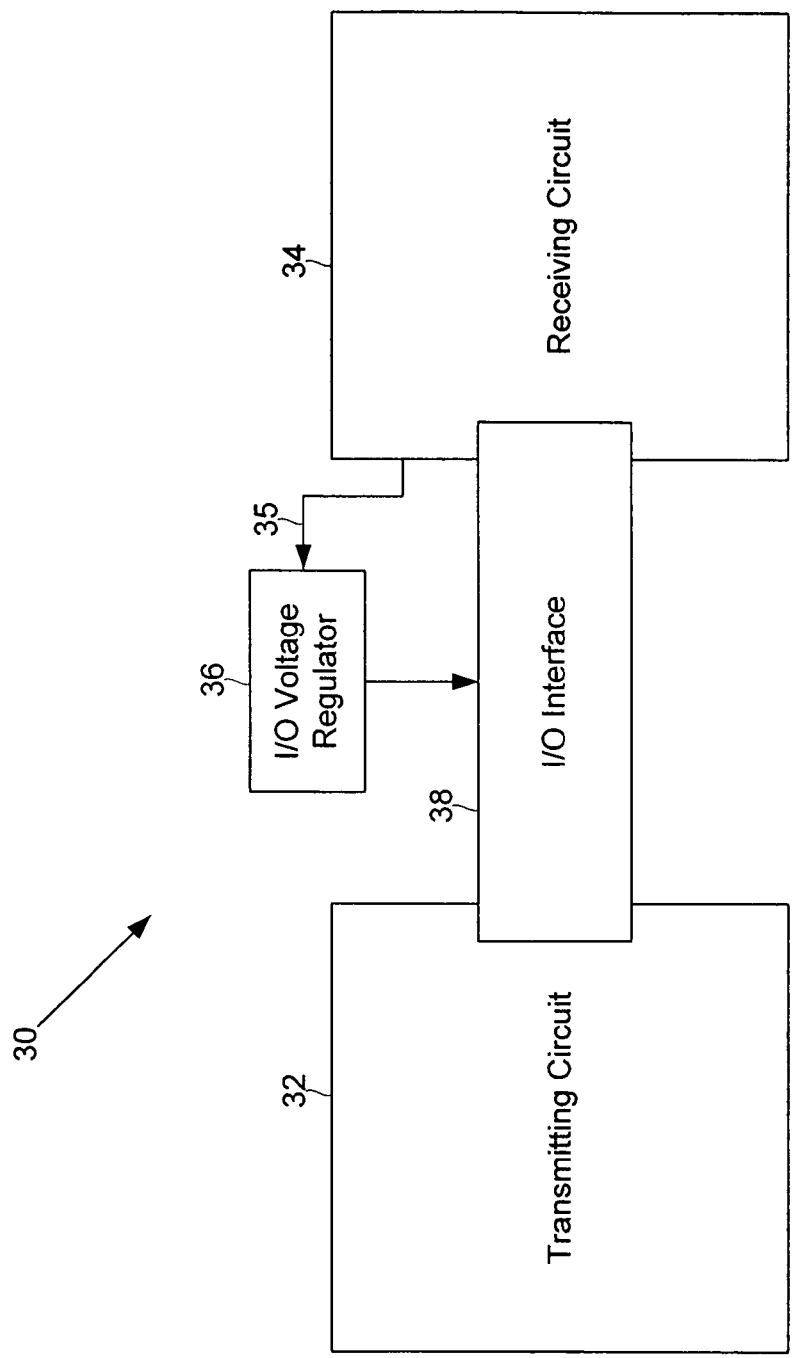
FIG. 3 shows a portion of a computer system in accordance with an embodiment of the present invention.

FIG. 3 shows an exemplary computer system in accordance with an embodiment of the present invention. Particularly, FIG. 3 shows a communication system 30 between a transmitting circuit 32 and a receiving circuit 34. Communication between the transmitting circuit 32 and the receiving circuit 34 occurs over an I/O interface 38.

A power supply level of the I/O interface 38 is controlled by a voltage regulator 36. In one or more embodiments of the present invention, the voltage regulator 36 is disposed on a system board on which the transmitting circuit 32 and the receiving circuit 34 are also disposed.

Typical I/O voltage regulators are programmed/designed during fabrication to a set desired voltage. However, in one or more embodiments of the present invention, the I/O voltage regulator 36 is dynamically controllable to adjust a power supply level of the I/O interface 38 both during system startup and during system operation. As shown in FIG. 3, a signal 35 from the receiving circuit 34 may be used to adjust the I/O voltage regulator 36. In one or more other embodiments of the present invention, the I/O voltage regulator 36 may be adjustable dependent on a signal (not shown) from the transmitting circuit 32.

Figure 4:
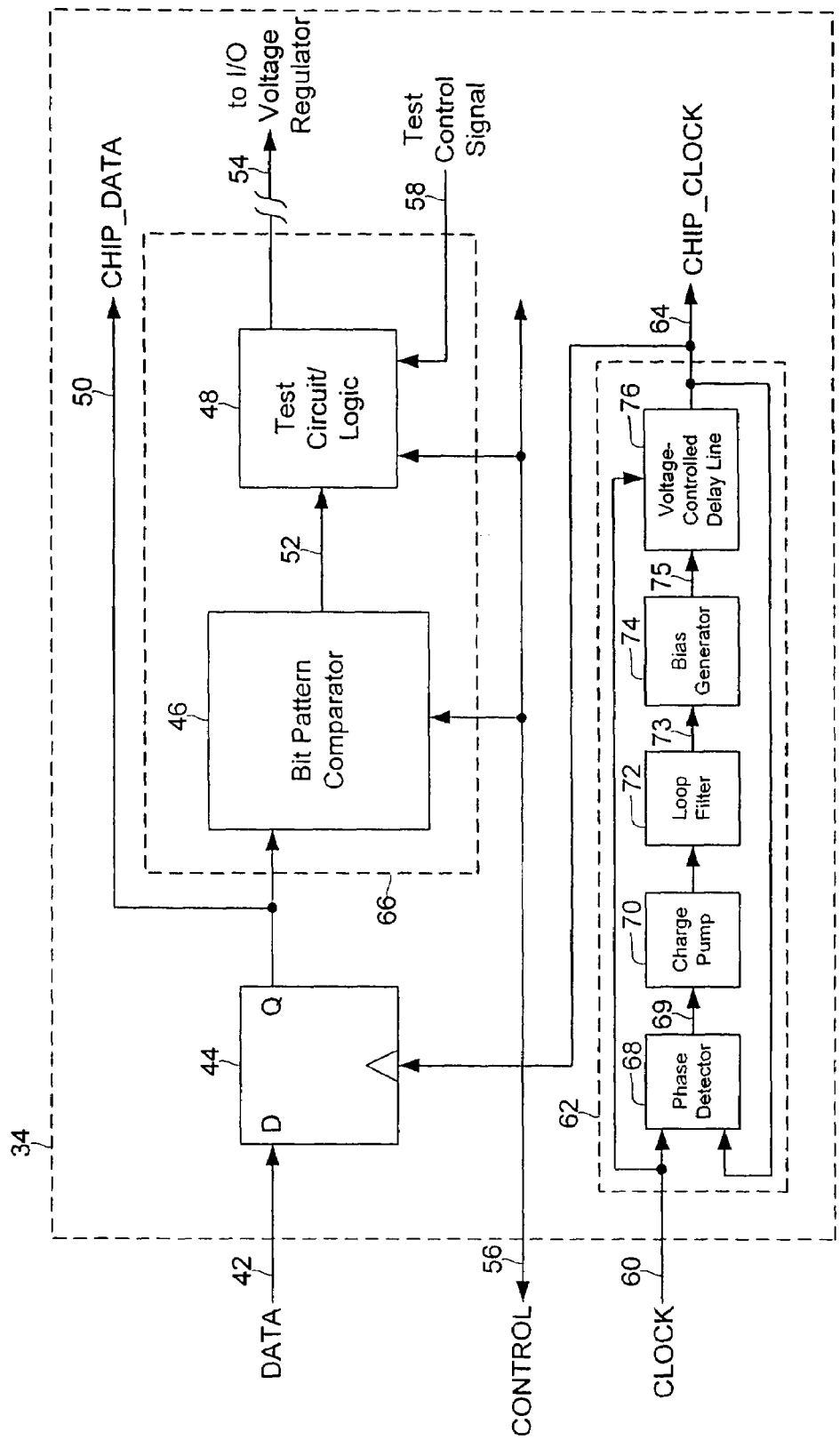
FIG. 4 shows a block diagram of a portion of a computer system in accordance with an embodiment of the present invention.

As discussed above, a power supply level of an I/O interface (e.g., 38 in FIG. 3) controlled by an I/O voltage regulator (e.g., 36 in FIG. 3) may be adjustable dependent on a bit error rate across the I/O interface. FIG. 4 shows a block diagram of a portion of an exemplary computer system used to generate a adjustment/calibration signal to the I/O voltage regulator.

In FIG. 4, the block diagram may represent part of a receiving circuit 34. However, those skilled in the art will understand that, in one or more other embodiments of the present invention, the block diagram may represent part of another circuit such as, for example, the I/O voltage regulator itself.

Still referring to FIG. 4, a clock signal 60 serves as an input to a delay locked loop 62, which, in turn, generates a chip clock signal 64. The delay locked loop 62 is used to ensure that a phase delay between the clock signal 60 and the chip clock signal 64 is fixed. Within the delay locked loop 62, a voltage-controlled delay line 76 inputs the clock signal 60 and generates the chip clock signal 64 dependent thereon.

The chip clock signal 64, while also being propagated to circuitry outside the delay locked loop 62, is fed back to an input of a phase comparator 68 of the delay lock loop 62, which is arranged to compare phases of the clock signal 60 and the chip clock signal 64. Dependent on the phase comparison, the phase comparator 68 outputs pulses on signals 69 to a charge pump 70, which, in turn, controls a current of a loop filter 72 used to maintain the stability of the delay locked loop 62. In response, the loop filter 72 outputs a control voltage 73 to a bias generator 74, which, in turn, generates bias signals 75 to the voltage-controlled delay line 76. The bias signals 75 modulate the delays of elements (not shown) in the voltage-controlled delay line 76 such that a fixed relationship is maintained between the clock signal 60 and the chip clock signal 64.

The chip clock signal 64, in addition to being propagated to other portions (not shown) of the receiving circuit 34, is used to clock a latch 44 (e.g., a DQ flip-flop) that receives data on a data signal 42. In other words, data on data signal 42 is latched by the latch 44 depending on an arrival time of the chip clock signal 64 to the latch 44. The latched data on the data signal 42 forms a chip data signal 50 that may then, under normal mode operations, be propagated to other portions (not shown) of the receiving circuit 34. However, those skilled in the art will note that depending on the arrival time of chip clock signal 64 to the latch 44, some or all of the latched data on the chip data signal 50 may not equal the corresponding states of data on the data signal 42. Increased bit error rates may occur due to, for example, process, temperature, and voltage variations that adversely effect the I/O interface (e.g., 38 in FIG. 3).

Those skilled in the art will note that, in one or more embodiments of the present invention, the receiving circuit 34 may include a plurality of latches 44 for latching data transmitted on multiple data signals.

In order to determine a condition of the I/O interface, the receiving circuit 34 also includes circuitry that selectively compares a known transmitted bit pattern with a received bit pattern. When determining a bit error rate, for example, during a test mode, a control signal 56 operatively connected to a transmitting circuit (e.g., 32 in FIG. 3) via an I/O interface (e.g., 38 in FIG. 3) indicates a known bit pattern transmitted by the transmitting circuit (e.g., 32 in FIG. 3) to a test stage 66 of the receiving circuit 34.

Specifically, the known transmitted bit pattern on the control signal 56 is provided to a bit pattern comparator 46, which, in turn, compares the known transmitted bit pattern to a latched or received bit pattern on the chip data signal 50 generated from the latch 44. Dependent on the comparison, the bit pattern comparator 46, via signal 52, indicates to test circuit/logic 48 (also part of test stage 66) a bit error rate or the number of data bits not matching between the known transmitted bit pattern and the latched bit pattern on the chip data signal 50.

Based on the bit error rate determined by either the bit pattern comparator 46 or test circuit/logic 48, the test circuit/logic 48, under direction of any one of the control signal 56 and a test control signal 58, outputs an adjustment signal 54 to the I/O voltage regulator (e.g., 36 in FIG. 3). The I/O voltage regulator (e.g., 36 in FIG. 3) then uses the adjustment signal 54 to adjust a power supply level of the I/O interface (e.g., 38 in FIG. 3). Thus, in effect, the power supply level of the I/O interface (e.g., 38 in FIG. 3) is dynamically adjustable dependent on a bit error rate across the I/O interface (e.g., 38 in FIG. 3).

Those skilled in the art will understand that by dynamically adjusting the power supply level of an I/O interface (e.g., 38 in FIG. 3), characteristics of one or more data and clock signals transmitted across the I/O interface may be adjusted so as to improve data transmission across the I/O interface.

Those skilled in the art will note that, in one or more embodiments of the present invention, an interface between the receiving circuit 34 and the I/O voltage regulator (e.g., 36 in FIG. 3) is a digital interface.

Figure 5:
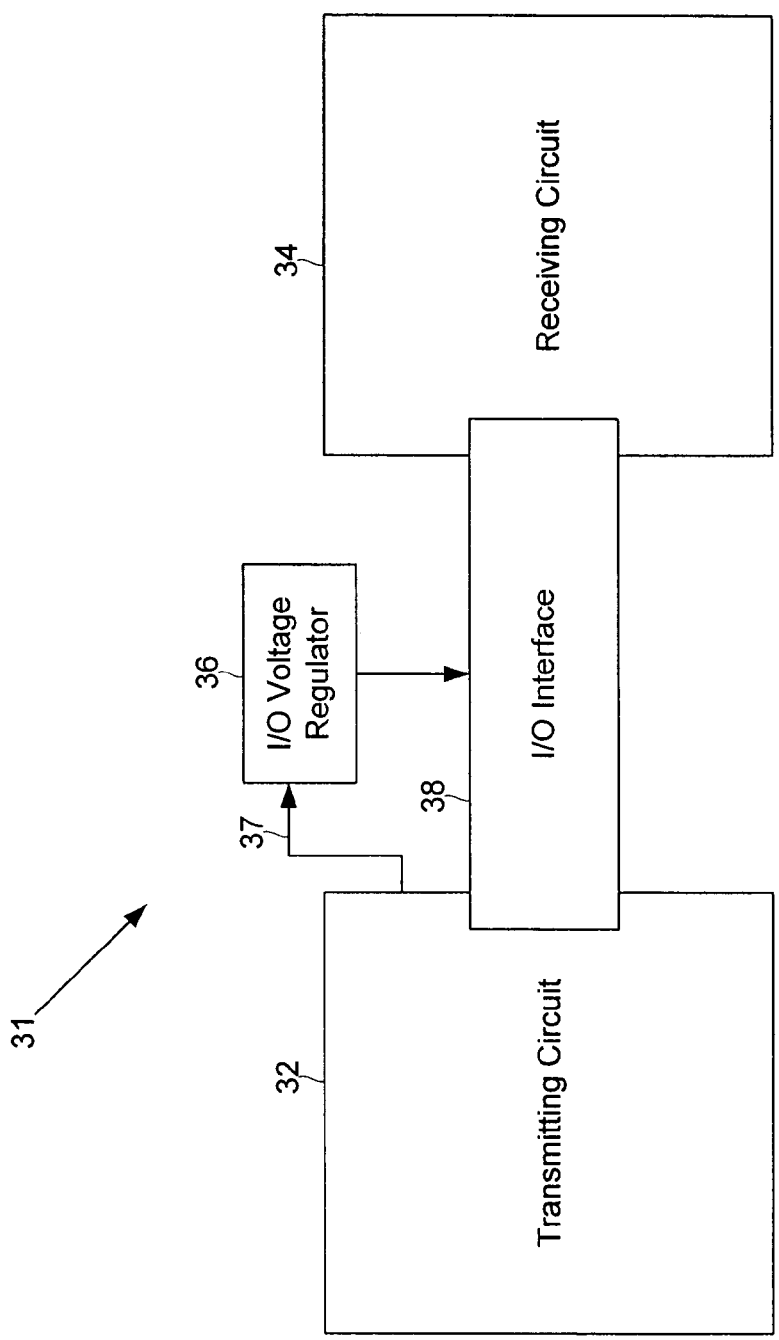
FIG. 5 shows a portion of a computer system in accordance with another embodiment of the present invention.

Further, as discussed above, in one or more embodiments of the present invention, the block diagram shown in FIG. 4 may be part of the I/O voltage regulator (e.g., 36 in FIG. 3), in which case the I/O voltage regulator (e.g., 36 in FIG. 3) would receive data over, for example, a digital interface, from the transmitting circuit (e.g., 32 in FIG. 3). Such an embodiment is shown in FIG. 5. In FIG. 5, the transmitting circuit 32 of a portion of a computer system 31 directly sends (i.e., not via the receiving circuit 34) data and control information 37 to the I/O voltage regulator 36.

In one or more embodiments of the present invention, the calibration technique discussed above with reference to FIGS. 3 and 4 may dynamically occur during system operation by invoking the calibration routine when particular bit error rates are detected and/or at preset time intervals.

Advantages of the present invention may include one or more of the following. In one or more embodiments of the present invention, because a power supply level of an I/O interface is adjustable both during system startup and system operation, I/O interface transmission may be dynamically controlled so as to lessen the effects of adverse I/O interface conditions that cause, for example, relatively high bit error rates.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
   an input/output interface operatively connected to a transmitting circuit and a receiving circuit, wherein the input/output interface is arranged to propagate a data signal between the transmitting circuit and the receiving circuit;
   a test stage arranged to compare a known bit pattern transmitted from the transmitting circuit with a received bit pattern; and
   a voltage regulator operatively connected to the test stage and arranged to control a power supply level of the input/output interface, wherein the voltage regulator is dynamically adjustable dependent on the comparison.

2. The computer system of claim 1, wherein the known transmitted bit pattern is transmitted from the transmitting circuit to the receiving circuit, and wherein the received bit pattern is received by the receiving circuit via the data signal.

3. The computer system of claim 1, wherein the known transmitted bit pattern is transmitted from the transmitting circuit to the voltage regulator.

4. The computer system of claim 1, wherein the test stage comprises:
   a bit pattern comparator arranged to compare the known transmitted bit pattern with the received bit pattern; and
   a test circuit operatively connected to the bit pattern comparator and arranged to output a digital adjustment signal to the voltage regulator.

5. The computer system of claim 1, wherein the input/output interface is arranged to propagate a clock signal between the transmitting circuit and the receiving circuit, the computer system further comprising:
   a delay locked loop arranged to input the clock signal and generate an output clock signal dependent thereon, wherein the received bit pattern is dependent on the output clock signal.

6. The computer system of claim 1, wherein the input/output interface is arranged to transmit the known transmitted bit pattern to the receiving circuit on a control signal between the transmitting circuit and the receiving circuit.

7. The computer system of claim 1, wherein the test stage is further arranged to compare the known transmitted bit pattern with the received bit pattern at predetermined time intervals.

8. A method of communicating across an input/output interface between a transmitting circuit and a receiving circuit, comprising:
   selectively transmitting a known bit pattern;
   receiving a bit pattern corresponding to the known bit pattern;
   comparing the known bit pattern with the received bit pattern; and
   dynamically adjusting a power supply level of the input/output interface dependent on the comparison.

9. The method of claim 8, further comprising:
   transmitting the known bit pattern from the transmitting circuit to the receiving circuit, wherein the dynamically adjusting is dependent on circuitry within the receiving circuit.

10. The method of claim 8, wherein the power supply level of the input/output interface is controlled by a voltage regulator, the method further comprising:
    transmitting the known bit pattern to from the transmitting circuit to the voltage regulator, wherein the dynamically adjusting is dependent on circuitry within the voltage regulator.

11. The method of claim 8, further comprising:
    transmitting the bit pattern corresponding to the known bit pattern to the receiving circuit on a data signal between the transmitting circuit and the receiving circuit;
    transmitting the known bit pattern to the receiving circuit on a control signal between the transmitting circuit and the receiving circuit;
    transmitting a clock signal to the receiving circuit on a clock signal between the transmitting circuit and the receiving circuit; and
    latching the bit pattern corresponding to the known bit pattern to form the received bit pattern dependent on the clock signal.

12. The method of claim 8, wherein comparing the known bit pattern with the received bit pattern occurs at predetermined time intervals.

13. A computer system, comprising:
    means for transmitting data;
    means for receiving data;
    means for interfacing the means for transmitting data and the means for receiving data;
    means for comparing a known pattern of data transmitted by the means for transmitting data with a received pattern of data corresponding to the known pattern of data; and
    means for controlling a power supply level of the means for interfacing, wherein the means for controlling dynamically adjusts the power supply level dependent on the means for comparing.

14. The computer system of claim 13, wherein the means for receiving data receives the known pattern of data, and wherein the received pattern of data is received by the means for receiving data.

15. The computer system of claim 13, wherein the means for controlling receives the known pattern of data, and wherein the received pattern of data is received by the means for controlling.

16. The computer system of claim 13, further comprising:

means for latching data to form the received pattern of data dependent on a clock signal transmitted by the means for transmitting data.

17. A computer system, comprising:

a transmitting integrated circuit arranged to output data, a clock signal, and a control signal to a receiving integrated circuit, wherein a characteristic of any one of the data and the clock signal is dependent on a power supply level;

the receiving integrated circuit arranged to input the data, the clock signal, and the control signal, the receiving integrated circuit comprising:

a delay locked loop arranged to output a chip clock signal dependent on the clock signal, a latch arranged to latch the data dependent on the chip clock signal, wherein the latched data forms a received bit pattern, and a test stage arranged to selectively compare the received bit pattern with a corresponding known bit pattern transmitted to the receiving integrated circuit via the control signal; and a voltage regulator arranged to control the power supply level dependent on the comparison.

18. A computer system, comprising:

a transmitting integrated circuit;

a receiving integrated circuit;

an input/output interface arranged to handle data communication between the transmitting integrated circuit and the receiving integrated circuit; and a voltage regulator operatively connected to the input/output interface and arranged to control a power supply level of the input/output interface, wherein the voltage regulator comprises:

circuitry arranged to receive a data pattern transmitted by the transmitting integrated circuit, circuitry arranged to receive a known data pattern corresponding to the received data pattern, and circuitry arranged to generate an adjustment signal based on a selective comparison of the known data pattern with the received data pattern, wherein the voltage regulator is arranged to dynamically adjust the power supply level dependent on the adjustment signal.

\* \* \* \* \*